United States Patent Office 2,735,786
Patented Feb. 21, 1956

2,735,786

AIR PERMEABLE, RESIN-COATED FABRIC AND PROCESS OF MAKING THE SAME

August F. Schramm, Jr., White Plains, N. Y.

No Drawing. Application August 4, 1953,
Serial No. 372,406

4 Claims. (Cl. 117—19)

This invention relates to a plastic treated fabric that combines the stiffness and other usual advantages of plastic treatment with water absorptiveness and permeability to air.

There has been extensive study of the application of plastic material over the surface of fabrics in manner to permit breathing of the resulting product. One such study has dealt with collar stock for men's shirts, in an effort to make collars that are relatively stiff and shape retaining but still subject to ventilation and absorption and evaporation of perspiration. I have worked in this field for many years and have been granted a number of patents relating to the resin or plastic treatment of fabrics, the latest of these being Patent No. 2,668,787 issued on February 9, 1954, on application Serial No. 205,087. Another of my patents in this field is 2,603,575 issued July 15, 1952.

These patents describe processes of and products resulting from applying particles of plastic over the surface of a textile, special means being employed to avoid closing of the pores between the particles and, in the later patent, to prevent excessive penetration within the fabric of the material of which the particles are composed.

The present invention serves these purposes and also provides for secure anchorage of the plastic particles upon the surface of the fabric, even though the selected plastic may be one that normally adheres poorly to the fabric.

Briefly stated, the present invention comprises the process and the product of application, to the surface of a fabric, of anchoring material in the form of a dispersion of spaced microscopic plastic particles and then macroscopic plastic particles and the subsequent union of these two kinds of particles to each other, so that the larger particles are anchored in position with the aid of microscopic particles first applied.

In a modification of the invention, an additional substance is first introduced into the fabric, this substance being one which either alone or by reaction with an ingredient of the dispersion of the anchoring material, later applied, gives partial water repellency and thus decreases diffusion of the anchoring material deep into the fabric.

In general, the method of the invention comprises the application of a limited proportion of an emulsion of colloidal (microscopic) particles of plastic material dispersed in a water medium to the surface of the fabric. The amount of the emulsion applied is such that, after evaporation of the medium, the microscopic particles that remain will be spaced from each other and will not form a continuous plastic film. Over this emulsion on the surface of the fabric, there is then applied a layer of macroscopic particles of thermoplastic material. Those of the macroscopic particles not in direct contact with the emulsion treated surface of the fabric are then removed. The remaining macroscopic particles are pressed and united with the particles of the emulsion, the whole being dried, warmed, and pressed, to effect this union.

As to materials used, the microscopic particles of anchoring material are composed of a stable, plastic, water insoluble, water dispersible resin that is compatible with the macroscopic particles to be applied later, the term "compatible" meaning non-separating once the two kinds of particles have been united to each other, as by dissolving or pressing together surface portions of one in the other at elevated temperatures. Examples of anchoring materials that meet these requirements and that are used to advantages are polyvinyl chloride resins and copolymers with vinylidene chloride or vinyl acetate, polystyrene, the polymethacrylates such as polymethyl methacrylate, polyvinyl butyral, and cellulose acetate, all as used being in the form of any commercial emulsion of the plastic.

These particles as used in the emulsion are in part at least colloidal or microscopic in size and constitute the dispersed phase in a medium consisting largely or wholly of water, the water containing any stabilizer or emulsifier that is commercially used to increase the stability or dispersibility of the anchoring material in water. A suitable size is 1–0.05 micron for particles constituting at least half of the total weight of the emulsified plastic material.

An important use of my product is a treated fabric that may be adhered to another sheet of fabric. Thus, a cotton cloth, with the emulsified and the larger particles applied to it, may be used as a backing sheet for a wool, synthetic fiber, or other more expensive fabric, the backing and facing sheets being composited by pressing together at the softening point of the plastic particles used. For such use and most other purposes, I use particles of thermoplastic material.

The macroscopic particles which are applied over the emulsion treated fabric are plastic, compatible with the anchoring material, and non-tacky, so as to be free flowing at ordinary temperatures. They may be pigmented or dyed. I find it particularly convenient and desirable to use the same kind of material in the macroscopic as in the microscopic particles, although I may use in the macroscopic particles any one of the plastics named herein with any one of the anchoring materials that is compatible and cohesive with the plastic of the said emulsion previously applied.

The macroscopic particles are suitably of fineness corresponding to a coarse flour or fine corn meal, although a considerable variation in size of these particles is permissible. Sizes below 20 mesh are satisfactory. In fact, I choose the size of macroscopic particles in accordance with the opening desired between the macroscopic particles in the finished product. The larger the particles used, the larger will be the individual spaces between them for reasons that will appear later herein.

The particles of microscopic size as well as macroscopic are suitably plasticized with a plasticizer that is conventional for the selected plastic. Examples of suitable plasticizers are dioctyl phthalate or adipate, dibutyl sebacate, tributoxyethyl phosphate, and butyl cresyl phosphate. I find particularly satisfactory results when the plasticizer as used is exposed in uncompounded condition in pores of the plastic particles. Such a product is made by spraying a fine mist of the plasticizer over the macro particles of polyvinyl chloride or the like, while they are being agitated, as by tumbling. During my drying and warming and pressing steps, this plasticizer becomes dissolved in the macroscopic material, at first in the parts adjacent to the said pores, and serves to facilitate bonding of the macroscopic particles to the originally emulsified particles and to the fabric.

The temperature of softening of the material applied in the emulsion and later in the macroscopic particles is chosen in accordance with the properties desired in the finished plastic treated fabric. For treating goods that are to withstand washing in boiling or practically boiling water, I use plastic material that does not soften to the tacky condition at such temperature. For goods that will never be subjected to such an elevated temperature, the plastic chosen may have a lower softening point. For a given kind of plastic selected, I control the softening point by the proportion of plasticizer, as within the range 20%–50% of plasticizer on the weight of the unplasticized plastic. The greater the proportion of plasticizer, the lower the softening point.

In any case, the plastic of the anchoring material and the macroscopic particles must be non-volatile and non-destructive of textile fibers.

The fabric to be treated is permeable. Examples are woven fabrics of cotton, wool, rayon, and any synthetic fibrous goods to which the applied plastic does not adhere well without the anchoring material.

As to proportions, I use a large proportion of water in the emulsion of the anchoring material so that evaporation of water from the applied spray of this material leaves spaces between adjacent particles of the anchoring material. While this proportion of water may vary with the different natures of the selected anchoring material I find a proportion of water within the range 30–70 parts of water to 100 of the total emulsion to be satisfactory. The proportion of water within the stated range is decreased as the total amount of applied plastic emulsion is made very low per square yard. The proportion of water may be increased, on the other hand, as thicker layers or larger proportions of the emulsion are applied over the fabric.

In general, I find that the emulsion should be used in concentration and in amount applied to leave about 0.3–0.8 oz. of plastic dry weight per square yard of fabric treated. This gives proper adherence of the larger plastic particles later applied and also leaves the desired spaces through the fabric. The amount of the emulsion applied will in general be less, for a given permeability of the finished treated fabric, when the cloth treated is one that is closely woven, and the amount will be larger for relatively very open mesh fabrics. The amount of emulsion applied is less in any case than the saturation proportion and less than that which, if applied and dried, would make impossible the blowing of cigarette smoke through the fabric with the mouth, the blowing through of smoke being evidence of preservation of permeability to air. The emulsion penetrates the surface of the fabric. Subsequent drying leaves the originally emulsified plastic particles embedded or anchored in the surface of the fabric.

The process of treatment of the fabric and the mechanism used for all steps are as described in my said Patent No. 2,603,575 with the following exceptions: (1) the non-solvent material (such as water) in said patent is substituted by the emulsion of anchoring material which is necessary in the present invention and (2) the aluminum salt solution, if used, is sprayed lightly on the fabric, by usual means, or other agent to give limited water repellency is introduced into the cloth in any conventional manner, before the emulsion of the present invention is applied.

The process of manufacture is essentially as follows. The selected fabric is passed through a spray of the emulsion of plastic anchoring material. The macroscopic particles are then applied as a continuous layer upon the surface of the fabric previously moistened by the spray. In such a layer, some particles will be in direct contact with the moistened surface of the fabric and will adhere lightly thereto, whereas other particles will be resting upon those in contact with the moistened surface. The cloth with the emulsion and the layer of macroscopic particles so applied is then subjected to means to remove those of the particles which are not directly in contact with the moistened surface. Thus, the fabric is passed under the tapping device shown in my Patent No. 2,603,575. This device taps the back or untreated side of the fabric while the treated side of the fabric faces downwardly. As a result, those particles which are not sticking directly to the moistened surface of the sheet fall off. This leaves the macroscopic particles on the fabric in spaced relation to each other, the spaces between the particles being areas of permeability except as closed in part by non-volatile microscopic particles of the emulsion first applied, which are also spaced from each other.

The sheet with the emulsion and applied spaced macroscopic particles is then passed through a warmer and drier and is subjected to a conventional ironing operation with conventional roller equipment (not shown).

When the particles used are thermoplastic, the temperature of ironing is that of partial softening of the particles of anchoring and macroscopic material so that, under the influence of the softening and the pressure, minute particles of anchoring material become welded to the macroscopice particles on the surface of the plastic, that is, the face or back or both. When the plastic used is thermo-setting, as in the case of urea or melamine partly condensed with formaldehyde, the temperature of ironing is that of setting of the plastic unless a subsequent curing step is to be used.

The invention will be further illustrated by description in connection with the following examples of the practice of it.

*Example 1*

A woven cotton fabric (canvas) is given a light mist spray of a polyvinyl chloride emulsion known as Geon 576 Latex containing 35 parts of dioctyl phthalate for 100 of polyvinyl chloride, the emulsion having been reduced in concentration before use by the addition of water in amount to give approximately 60 parts of water to 40 of the Geon 576 on the dry basis.

Polyvinyl chloride, with the same amount of the same plasticizer, in the pores of the particles of the polyvinyl chloride, and in the form of particles of somewhat unctuous surface but free flowing and of size to pass to the extent of at least 90% by weight through a 20-mesh screen, provides the macroscopice material is applied as a layer over the surface of the emulsion treated cloth. Excess of the macroscopic particles beyond a layer of single particle thickness is then removed, by tapping the back of the fabric while the goods with the applied macroscopic particles faces downward, in either horizontal or inclined position.

Then the whole is passed between a bank of electric heaters so that the temperature is raised uniformly to the point of evaporating the water from the emulsion and softening the macroscopic particles of plastic. The warm material is then passed between blowers so that the air circulation completes the drying of the warmed treated sheet.

All of these operations are performed with the mechanism shown in my Patent No. 2,603,575.

Finally the material is pressed by passing between pressure rollers of usual type, at the temperature of slight to moderate softening of the plastic.

*Example 2*

The procedure of Example 1 is followed except that the canvas to be treated is sprayed lightly with a solution of aluminum formate in water in the proportion of 95 parts of water to 5 of the formate, this spraying being done by any conventional means in advance of the time of spraying on the emulsion of the Geon latex.

The Geon latex used contains a small proportion of ammonium hydroxide. This ammonium hydroxide gives a precipitate of aluminum hydroxide on contact with the aluminum formate. The precipitate so formed remains near to or upon the surface of the fabric and decreases the subsequent penetration of the polyvinyl chloride emulsion.

*Example 3*

The procedure of Example 1 is followed except that any other one of the plastic materials listed herein serve as the emulsified particles in the emulsion sprayed upon the cloth and the same or another one of the plastic materials listed serves as the material in the form of macroscopic particles.

*Example 4*

The procedure of Examples 1, 2, or 3 is followed with the substitution of woven wool, silk, or rayon fabric for the cotton goods used in those examples.

*Example 5*

The procedure of Examples 1-4 is repeated except that any common laundry blue is introduced into the emulsion of plastic particles in amount to establish the color desired. The blueing becomes fixed in the particles of plastic in the emulsion so that the color is not removed by repeated laundering or by chlorine preparations such as Chlorox.

This fixing of color by the emulsion may be used with dispersions of various pigments as, for instance, with ultramarine blue, iron oxide pigment, or titanium dioxide dispersed in water, in colloidal or quasi-colloidal form. The pigment concentrates over the surfaces of the microscopic plastic particles of the emulsion and becomes lodged therein in the particles during the subsequent processing. Likewise I may use, in place of the pigments, dyes selected to establish the color desired. Examples of dyes that may be used are the water insoluble dyes, such as the oil soluble dyes which are more soluble in the warm plastic than in water and tend, therefore, to concentrate in the plastic.

In all of these examples the concentration and proportion of the emulsion or emulsions applied is less than that which forms a continuous film upon removal of the water from the emulsion by evaporation.

Products made as described herein are permeable to air and absorptive of water. They possess, in addition, the moderate stiffness of plastic treated goods. They are useful as collar interliners, shoe material, and the like.

It will be understood also that it is intended to cover all changes and modifications of the examples of the invention herein chosen for the purpose of illustration which do not constitute departures from the spirit and scope of the invention.

What I claim is:

1. In making a resin treated fabric that is permeable to air and absorptive of water, the process which comprises applying to the fabric an emulsion of microscopic particles of solid water insoluble resin dispersed in water, the emulsion being applied to a surface of the fabric in limited proportion less than that required for saturation and less than that which, after drying, would produce a continuous impermeable film on the fabric, then applying over the emulsion treated, wet surface macroscopic particles of solid water insoluble resinous composition that are thermoplastic and compatible with the plastic material of the said emulsion, removing those of the applied macroscopic particles that are not in direct contact with the emulsion treated fabric, this removal leaving spaces between remaining macroscopic particles, then warming the macroscopic particles and the emulsion to the temperature of drying of the water from the emulsion and softening of the macroscopic particles and particles of plastic material of the emulsion, and pressing the macroscopic particles in the thus softened condition against the particles applied in the emulsion.

2. The process of claim 1, in which the resin of the emulsion is a polyvinyl chloride resin.

3. The process of claim 1 in which the resin of the emulsion and of the macroscopic particles is a polyvinyl chloride resin.

4. A treated fabric comprising spaced microscopic particles of solid water insoluble resin anchored in surface portions only of the fabric and macroscopic particles of solid water insoluble, thermo-plastic resinous composition disposed in spaced relationship to each other over the surface of the fabric and the microscopic particles and united thereto, the said resinous composition being compatible with the material of the microscopic particles and the whole forming a plastic-treated, permeable fabric with the said resin and resinous composition confined to the superficial parts of the product.

References Cited in the file of this patent

UNITED STATES PATENTS

| | | |
|---|---|---|
| 1,673,797 | Brown | June 19, 1928 |
| 2,009,139 | Redman | July 23, 1935 |
| 2,323,387 | Edelstein | July 6, 1943 |
| 2,428,716 | McGill et al. | Oct. 7, 1947 |
| 2,439,051 | McGill | Apr. 6, 1948 |
| 2,603,575 | Schramm | July 15, 1952 |
| 2,633,434 | Tanner | Mar. 31, 1953 |